(12) United States Patent
Su et al.

(10) Patent No.: US 12,087,249 B2
(45) Date of Patent: **\*Sep. 10, 2024**

(54) PERCEPTUAL COLOR ENHANCEMENT BASED ON PROPERTIES OF RESPONSES OF HUMAN VISION SYSTEM TO COLOR STIMULUS

(71) Applicant: SAMSUNG ELECTRONICS CO., LTD., Suwon-si (KR)

(72) Inventors: Chang Su, Foothill Ranch, CA (US); Chenguang Liu, Tustin, CA (US); Pradeep Nagesh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,902

(22) Filed: Jan. 9, 2023

(65) Prior Publication Data
US 2023/0222991 A1 Jul. 13, 2023

Related U.S. Application Data

(63) Continuation of application No. 17/491,085, filed on Sep. 30, 2021, now Pat. No. 11,557,265.

(Continued)

(51) Int. Cl.
*G09G 5/02* (2006.01)
*G09G 5/00* (2006.01)
(Continued)

(52) U.S. Cl.
CPC ............... *G09G 5/02* (2013.01); *G09G 5/005* (2013.01); *H04N 9/68* (2013.01); *G09G 2320/0666* (2013.01); *G09G 2340/06* (2013.01)

(58) Field of Classification Search
CPC .. G09G 5/02; G09G 5/005; G09G 2320/0666; G09G 2320/06;
(Continued)

(56) References Cited

U.S. PATENT DOCUMENTS

| 4,724,477 A | 2/1988 | Ellis et al. |
| 6,868,179 B2 | 3/2005 | Gruzdev et al. |

(Continued)

FOREIGN PATENT DOCUMENTS

| JP | 2020-005136 A | 1/2020 |
| KR | 10-2004-003544 A | 4/2004 |

OTHER PUBLICATIONS

International Search Report & Written Opinion dated Feb. 21, 2022 for International Application PCT/KR2021/016229 from Korean Intellectual Property Office, pp. 1-6, Republic of Korea.

(Continued)

*Primary Examiner* — Wesner Sajous
(74) *Attorney, Agent, or Firm* — Sherman IP LLP; Kenneth L. Sherman; Steven Laut

(57) ABSTRACT

A method includes modeling, by a computing device, color saturation variations of different hues in a working color space with one or more properties of responses of a human vision system (HVS) to color stimulus. The computing device further generates one or more color saturation variation models based on the responses of the HVS to color stimulus.

20 Claims, 14 Drawing Sheets
(1 of 14 Drawing Sheet(s) Filed in Color)

Related U.S. Application Data

(60) Provisional application No. 63/113,517, filed on Nov. 13, 2020.

(51) Int. Cl.

| | |
|---|---|
| *G09G 5/10* | (2006.01) |
| *H04N 1/60* | (2006.01) |
| *H04N 5/57* | (2006.01) |
| *H04N 9/64* | (2023.01) |
| *H04N 9/68* | (2023.01) |
| *H04N 9/69* | (2023.01) |
| *H04N 9/79* | (2006.01) |

(58) Field of Classification Search
  CPC ... G09G 2320/0271; G09G 2320/0276; G09G 5/10; H04N 1/60; H04N 1/6002; H04N 1/6019; H04N 1/6011; H04N 1/6027; H04N 1/6041; H04N 1/6075; H04N 5/57; H04N 9/64; H04N 9/646; H04N 9/68; H04N 9/69; H04N 9/74; H04N 9/77; H04N 9/79; H04N 11/20; H04N 13/15
  See application file for complete search history.

(56) References Cited

U.S. PATENT DOCUMENTS

| | | |
|---|---|---|
| 7,251,361 B2 | 7/2007 | Gruzdev et al. |
| 7,545,976 B2 | 6/2009 | Gondek et al. |
| RE43,085 E | 1/2012 | Lin et al. |
| 8,467,604 B2 | 6/2013 | De Kruif |
| 8,860,747 B2 | 10/2014 | Bhaskaran et al. |
| 8,988,452 B2 | 3/2015 | Peng et al. |
| 9,936,199 B2 | 4/2018 | Froehlich et al. |
| 9,961,237 B2 | 5/2018 | Atkins |
| 10,542,296 B2 | 1/2020 | Lu et al. |
| 10,679,328 B2 | 6/2020 | Nanda et al. |
| 2003/0016862 A1 | 1/2003 | Ohga |
| 2008/0043260 A1* | 2/2008 | Ramanath ............ G06T 11/001 358/1.9 |
| 2009/0041341 A1* | 2/2009 | Scheibe ................ G09G 5/02 345/83 |
| 2009/0147986 A1 | 6/2009 | Kaida et al. |
| 2010/0085487 A1 | 4/2010 | Sarkar et al. |
| 2011/0013833 A1* | 1/2011 | Hoof ...................... G06F 18/00 382/167 |
| 2011/0050718 A1 | 3/2011 | Wang |
| 2011/0255101 A1* | 10/2011 | Edge ................... H04N 1/6058 358/1.9 |
| 2013/0093783 A1 | 4/2013 | Sullivan et al. |
| 2014/0010447 A1 | 1/2014 | Yang et al. |
| 2015/0022567 A1 | 1/2015 | Sullivan et al. |
| 2017/0098429 A1 | 4/2017 | Sullivan et al. |
| 2020/0092441 A1* | 3/2020 | Su ......................... H04N 9/67 |
| 2020/0294439 A1 | 9/2020 | Mandle et al. |

OTHER PUBLICATIONS

U.S. Notice of Allowance for U.S. Appl. No. 17/491,085 mailed Sep. 15, 2022.

European Supplementary Search Report & Opinion dated Jun. 30, 2023 for European Patent Application 21892285.4 from European Patent Office, pp. 1-12, Munich, DE.

Hung, P-C, et al., "Determination of Constant Hue Loci for a CRT Gamut and Their Predictions Using Color Appearance Spaces", Color Research & Application, Oct. 1, 1995, pp. 285-295, vol. 20, No. 5, John Wiley & Sons, Inc., United States.

Ebner, F. et al., "Development and testing of a color space (IPT) with improved hue uniformity," The 6th Color Imaging Conference: Color Science, Systems and Applications: Final Program Color Imaging Conference, IS&T, Nov. 1, 1998, p. 8-13, United States.

European Examination Report dated Mar. 18, 2024 for European Patent Application 21 892 285.4 from European Patent Office, pp. 1-7, Munich, DE.

* cited by examiner

PERCEPTUAL COLOR ENHANCEMENT BASED ON PROPERTIES OF RESPONSES OF HUMAN VISION SYSTEM TO COLOR STIMULUS

CROSS-REFERENCE TO RELATED APPLICATIONS

This application is a continuation of U.S. Non-Provisional patent application Ser. No. 17/491,085, filed Sep. 30, 2021, which claims the priority benefit of U.S. Provisional Patent Application Ser. No. 63/113,517, filed Nov. 13, 2020, both incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to color enhancement display systems, and in particular, to perceptual color enhancement applications based on properties of responses of human vision system (HVS) to color stimulus.

BACKGROUND

Colorfulness and vividness loss in HDR broadcasting and multimedia industries are common, for example: content creation, gamut mismatching between contents and devices, tone-mapping, etc. High-performance color enhancement (CE) techniques generally adopt a Color-Appearance Model (CAM) to separate the brightness component of a color from chroma components, and enhance the saturation component only to keep hue and brightness constant, thus avoiding serious hue distortions. Such techniques are very processing-wise expensive due to the complex computations that are necessary to CAM-based processing, including exponential, logarithmic, and trigonometric operators, etc.

Economical and hardware friendly CE techniques mainly adopt linear processing to enhance saturation to improve efficiency and decrease hardware and processing costs. Due to the nonlinear properties of the human vision system (HVS), however, such techniques perform poorly in practice. Visible artifacts even high visual impacts and detail loss are general issues of the linear solutions. CE techniques generally adopt content-adaptive or region-based processing for maintaining the continuity and the naturalness of the input colors. For example, adaptively computing the chromatic offsets or scalers to avoid over-saturating the already very saturated colors, or generating the out-of-chromatic-limit colors. Such processing approaches, however, can be expensive in terms of processing bandwidth and hardware requirements. In addition, to solve the detail loss issue, many CE techniques contain detail-enhancing processing. All the aided processing may greatly increase the hardware and processing required.

SUMMARY

One or more embodiments relate to color enhancement display systems, and in particular, to perceptual color enhancement applications based on properties of responses of human vision system (HVS) to color stimulus. In some embodiments, a method includes modeling, by a computing device, color saturation variations of different hues in a working color space with one or more properties of responses of a human vision system (HVS) to color stimulus. The computing device further generates one or more color saturation variation models based on the responses of the HVS to color stimulus.

In some embodiments, a non-transitory processor-readable medium that includes a program that when executed by a processor performs a perceptual color enhancement method based on properties of responses of HVS to color stimulus, includes modeling, by the processor, color saturation variations of different hues in a working color space with one or more properties of responses of a HVS to color stimulus. The processor generates one or more color saturation variation models based on the responses of the HVS to color stimulus.

In some embodiments, an apparatus comprises a memory storing instructions. At least one processor executes the instructions including a process configured to model color saturation variations of different hues in a working color space with one or more properties of responses of a HVS to color stimulus, and map an input color from a source content to an output color in the working color space using the one or more color saturation variation models.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
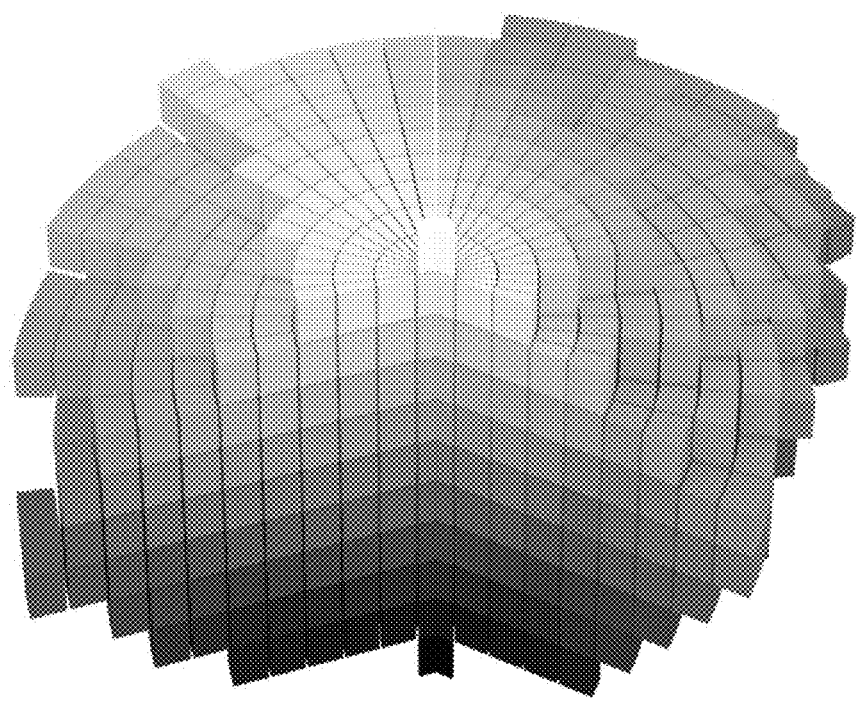
FIG. 1 shows examples of perceptual colors that the human vision system (HVS) may perceive in the real world.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide perceptual color enhancement applications based on properties of responses of human vision system (HVS) to color stimulus. In one or more embodiments, a method includes determining, by a computing device, a working color space of a source content and a resulting content. The computing device models color saturation variations of different hues in the working color space with one or more properties of responses of an HVS to color stimulus. The computing device generates one or more color saturation variation models based on the responses of the HVS to color stimulus. An input color is mapped from the source content to an output color in the working color space using the one or more color saturation variation models.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns. The term "image" may indicate a still image or a moving picture of a video, i.e., the latter indicating the video itself. The term "image" may include a partial or the entire screen image displayable on a display besides a still image (e.g., a photograph) or a video. In addition, the term "image" may also originally include a displayable screen image itself such as a user interface or a webpage besides a still image (e.g., a photograph) or a video.

It should be noted that economical color enhancement (CE) techniques generally have hue distortion issues due to the lack of support of the perceptually uniform color processing. High performance Color-Appearance Model (CAM)-based CE methods may also suffer from the hue distortion issues since even CAMs are not 100% perceptually uniform. A high-dimensional lookup table (LUT) is widely adopted in modern CE techniques. For example, the linear YUV model based CE mayneed two-dimensional (2D) LUTs, and a CAM-based CE may need a three-dimensional (3D) LUT since in a CAM, the brightness, the chroma, and the hue are tightly related. Changing one of the components may lead to unpredictable changes in the other two components. Therefore, a 3D LUT including multiple hue-chroma slides are common in high performance CAM-based CE. The high-dimensional LUTs, however, are very processing and hardware-wise expensive. They may need huge system resources, and greatly increase the computational complexity.

In some embodiments, the disclosed technology may utilize the HVS, which has evolved over a long period of time (since the beginning of human species) and has high robustness and flexibility with respect to different contents. In some embodiments, if appropriate descriptions of the properties of the responsesof HVS to color stimulus is obtained, the disclosed technology accurately predicts how human eyes perceive more saturated colors according to the given (or input) colors and can directly produce the final output colors by imitating HVS's behavior without computing gains and offsets.

In some embodiments, CE-based on HVS properties can be very powerful but also straightforward and economical regarding hardware and processing requirements. In one or more embodiments, the disclosed technology models the properties of HVS to the color stimulus. For example, in some cases, the disclosed embodiments can: find appropriate color sets that represent how HVS responds to different colors of the same hue; for a given hue, if HVS perceives different colors having different saturations, model the changes of the saturation; utilize models of the saturation changes to represent how HVS responds to color stimulus; with the models, generate an approach to color enhancement; generate natural and vivid colors that satisfy audiences, since one or more embodiments utilizes HVS properties.

FIG. 1 shows a representation 100 of perceptual colors of an HVS. Some embodiments utilize Munsell Renotations for the HVS. The Munsell system is based on rigorous measurements of the human visual system's responses to different color stimuli, and specifies color using 3D for hue (a specific color), value (lightness and darkness) and chroma (color intensity). The system comprises three independent dimensions that may be represented cylindrically in three dimensions as an irregular color solid: hue, measured by degrees around horizontal circles; chroma, measured radially outward from the neutral (gray) vertical axis; and value, measured vertically from 0 (black) to 10 (white). In each dimension, Munsell colors are as close to perceptually uniform, which makes the resulting shape irregular. Each horizontal circle is divided into five principal hues: Red, Yellow, Green, Blue, and Purple, along with five intermediate hues halfway between adjacent principal hues. Each of these ten steps is broken into ten sub-steps, so that one hundred hues are given integer values. Two colors of equal value and chroma, on opposite sides of a hue circle, are complementary colors, and mix additively to the neutral gray of the same value. Two colors of the same hue but different values and chroma are same-hue colors. Value, or lightness, varies vertically along the color solid, from black (value 0) at the bottom, to white (value 10) at the top. Neutral grays lie along the vertical axis between black and white. Chroma, measured radially from the center of each slice, represents the "purity" of a color, with lower chroma being less pure (more washed out, as in pastels). Different areas of the color space have different maximal chroma coordinates.

Figure 2:
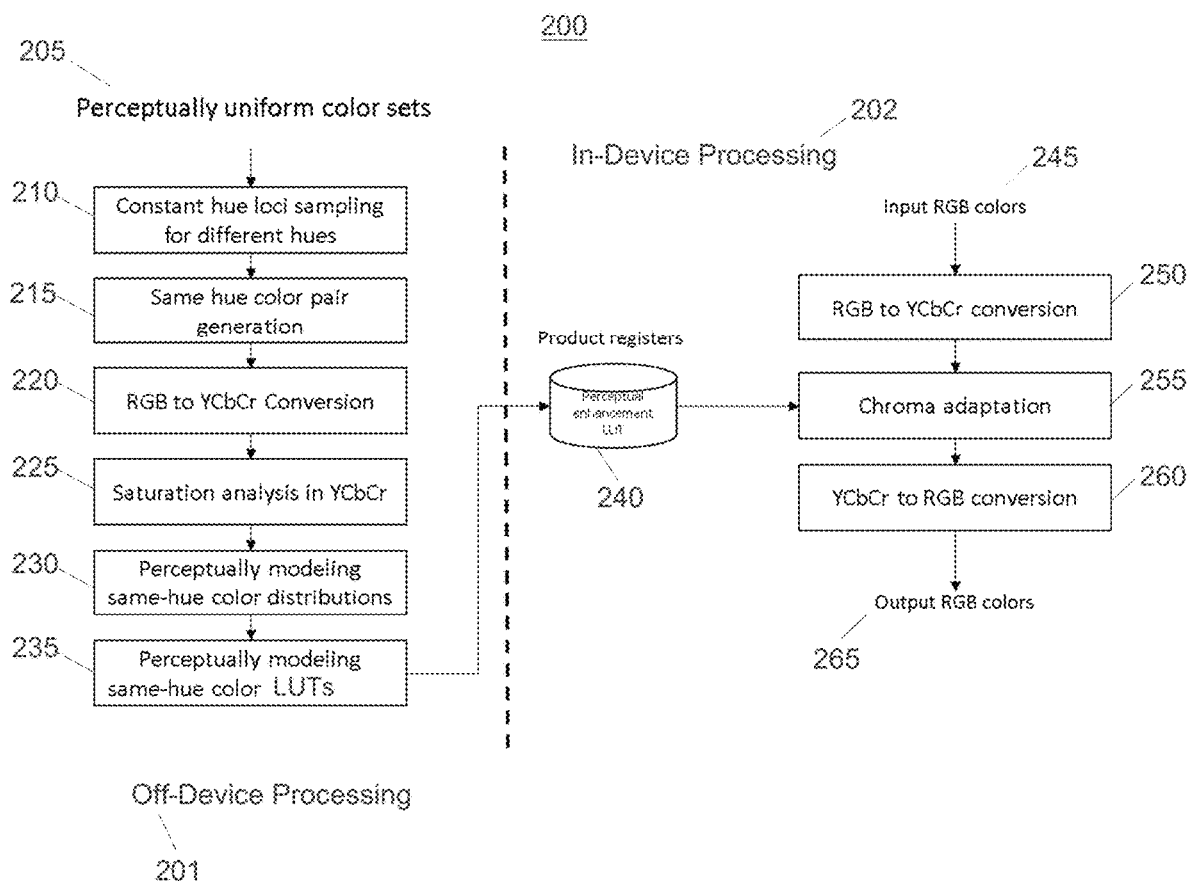
FIG. 2 shows an example overview of a system, according to some embodiments.

FIG. 2 shows an example overview of a system flow 200, according to some embodiments. In one or more embodiments, the disclosed technology includes a color enhancement process or algorithm based on the properties of the responses of the HVS to color stimulus. In some embodiments, the disclosed technology comprises two parts. One part is the off-device processing 201, which adopts the perceptual uniform color sets obtained based on measurements of human subjects' visual responses to color, e.g. Munsell Renotations, to build a robust model of the chromatic component variations to imitate the HVS responses to different colors of arbitrary given hues when the color's saturation continuously increases. Another part is the in-device processing 202, which adopts the HVS-based model obtained in the off-device processing to directly map an input color to its enhanced counterpart without computing the chroma offset or chroma scaler.

In some embodiments, for the off-device processing 201, the system flow 200 obtains or receives perceptually uniform color sets 205 defined in the CIE-1931 space based on a perceptually uniform color set, e.g., the Munsell Renotations. The perceptually uniform color sets result in multiple constant hue loci (CHL), where each of the colors belongs to the same hue but has a different saturation. In block 210, the system flow 200 provides the same-hue color sampling along different CHL. The sampled same-hue colors from a CHL have the same hue, but different saturation levels. In block 215, the system flow 200 provides a same hue color pair generation, which organizes the neighboring same-hue colors in pairs; thus in each color pair, there is one that is a less saturated color, and the other is, therefore, a more saturated color. Since the same-hue color pairs are from the CHL, which are built based on the HVS's properties of the responses to different color stimuli, the variation between the colors in each same-hue color pair reflects how the HVS responds to different colors which have the same hue but different saturation levels. In block 220, the system flow 200 provides the conversion between the RGB space, which is a common source content space, and a working space, e.g., the YCbCr space. In block 225, the system flow 200 provides saturation analysis of the same-hue color variations between different same-hue colors in the workspace, e.g., the YCbCr space. In block 230, the system flow 200 projects the same-hue color variations defined in high-dimensional workspace, e.g., YCbCr, to each of the chromatic axes, e.g., the Cb or Cr axes, thus reducing the dimensions of the dataset to be modeled, and greatly decreasing the costs. Then, block 230 models the distributions of the same hue color variations in low-dimensional space with one or more sets of perceptual parameters related to HVS. In block 235, the system flow 200 computes one or more same-hue color variation LUTs from the perceptual parameters obtained by block 230. The LUTs thus are built based on the HVS properties of color responses. The LUTs are stored in the product registers that utilize a perceptual enhancement LUT 240 on the in-device processing 202 portion of the system flow 200. The system flow 200 obtains or receives input RGB colors 245. In block 250, the system flow 200 provides RGB to a working space conversion, e.g., RGB to YCbCr. In block 255, the system flow 200 provides chroma adaptation using the LUTs obtained in the off-device processing 201 and stored in a device. With the LUTs, block 255 directly maps a color of a working space to the corresponding more saturated counterpart in the same working space. In block 260, the system flow 200 converts the enhanced color in a working space, e.g., YCbCr, to the RGB space. The system flow 200 provides output RGB colors 265.

In one or more embodiments, the enhanced colors match the properties of the responses of the HVS to color stimulus. They are perceptually natural and visually pleasing. The system flow 200 can effectively avoid key issues and/or problems in other color enhancement techniques, such as: details loss in highly saturated colors, and perceptual hue distortions. Some embodiments can significantly decrease hardware costs as the system flow 200 does not require a CAM, but achieves similar or better performance than CAM. The system flow 200 does not require content-adaptive processing or region-based analysis, which are common in conventional techniques for improving the robustness to different contents. One or more embodiments successfully model chromatic components with dimension reduced independent models. Some embodiments can decrease the complexity of high-dimensional LUT into one or multiple 1-D LUT (e.g., perceptual enhancement LUT 240), greatly decrease the costs of a LUT and provide low-cost 1-D LUT made based on HVS properties leading to high visual quality. One or more embodiments achieve similar color enhancing visual effects as u-v scaling and chroma scaling, but effectively protects the delicate details. In the colors that are not highly saturated, system 200 obtains visually pleasing enhanced colors with fine details.

Figure 3:
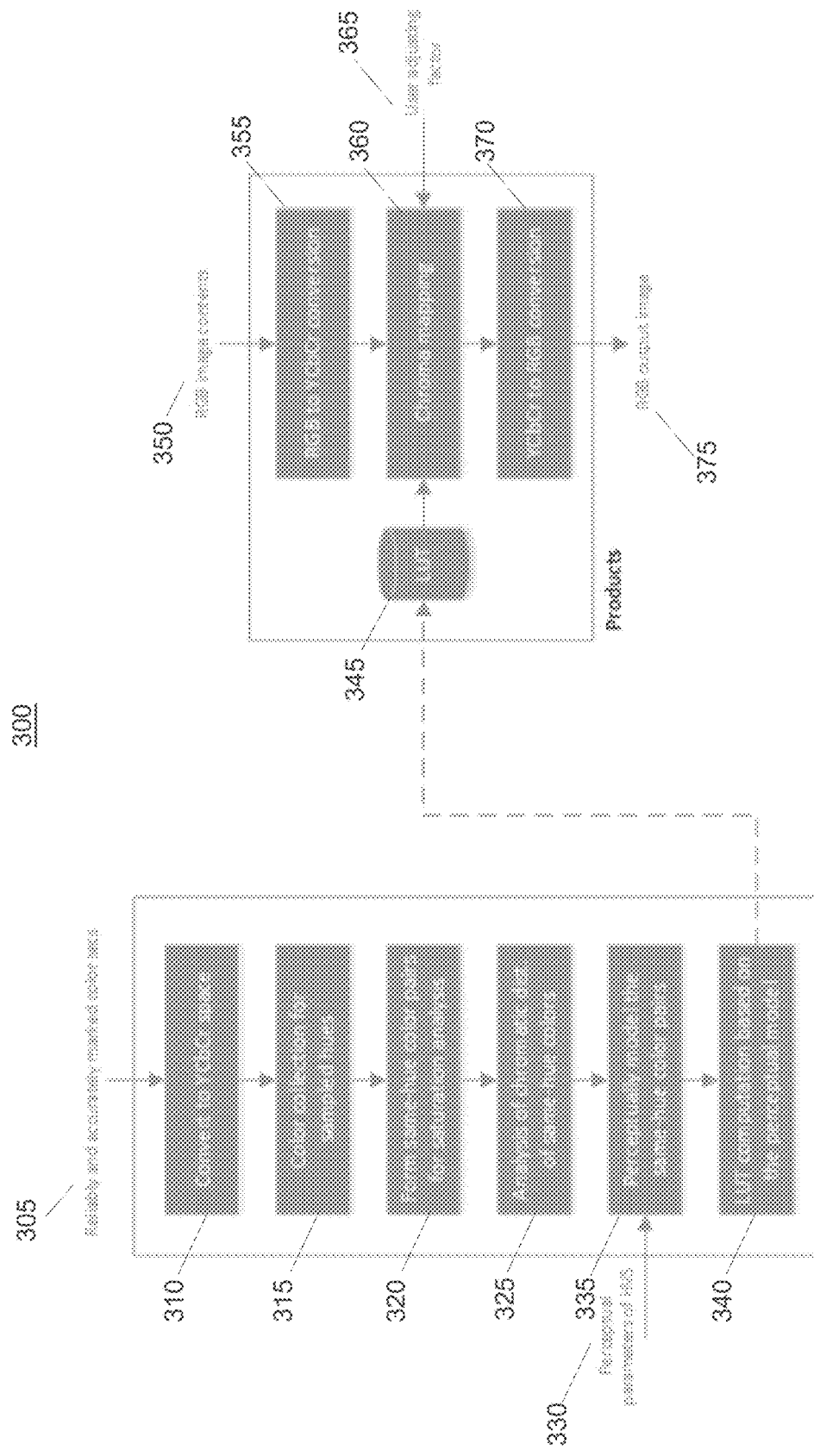
FIG. 3 shows an example high-level block diagram of a system, according to some embodiments.

FIG. 3 shows an example high-level block diagram of a system 300, according to some embodiments. In some embodiments, the system 300, for the off-device chroma modeling 301, obtains or receives reliably and accurately marked color sets 305 of CHL. In block 310, the off-device chroma modeling 301 provides conversion of the marked color sets 305 to a working space, e.g., YCbCr. In block 315, the off-device chroma modeling 301 samples and collects the color sets of CHL, thus forming the same-hue color sets of different hues. In block 320, the off-device chroma modeling 301 re-organizes the same-hue colors as the same-hue color pairs, where one color is less saturated than the other one. The same-hue color pairs are for variations of saturation analysis. In block 325, the off-device chroma modeling 301 provides analysis of chromatic distributions of same-hue color pairs in the working space; thus obtaining knowledge about how the HVS behaves to the colors with different saturation levels but the same hue. The perceptual parameters of HVS 330 are input to block 335, where the parameters are for modeling the saturation variations between different colors belonging to the same hue in the working space. The modeling processing with the perceptual parameters is repeated multiple times until the obtained perceptual parameters can suitably represent (e.g., representation that satisfies one or more determined or pre-determined criterions) the saturation variations of the same-hue colors. In block 340, the off-device chroma modeling 301 provides for LUT computation based on the perceptual model obtained from the perceptual parameters modeled in 335, which are stored in the LUT 345 in the products (e.g., smart TVs, monitors, computing pad devices, smart phones, etc.) implementing inline processing. The system 300 obtains or receives input RGB image content 350. In block 355, the system 300 provides RGB to a working space (e.g., YCbCr) conversion. In block 360, the system 300 provides chroma mapping using the LUT obtained in off-device processing, stored in in-device 345, and with receipt of a user adjusting factor 365. The factor controls how much (e.g., percentage) the final output colors keep their original saturation. In block 367, the system 300 provides a working space, e.g., YCbCr, to RGB conversion. The system 300 provides output as an RGB output image 375.

Figures 4A, 4B:
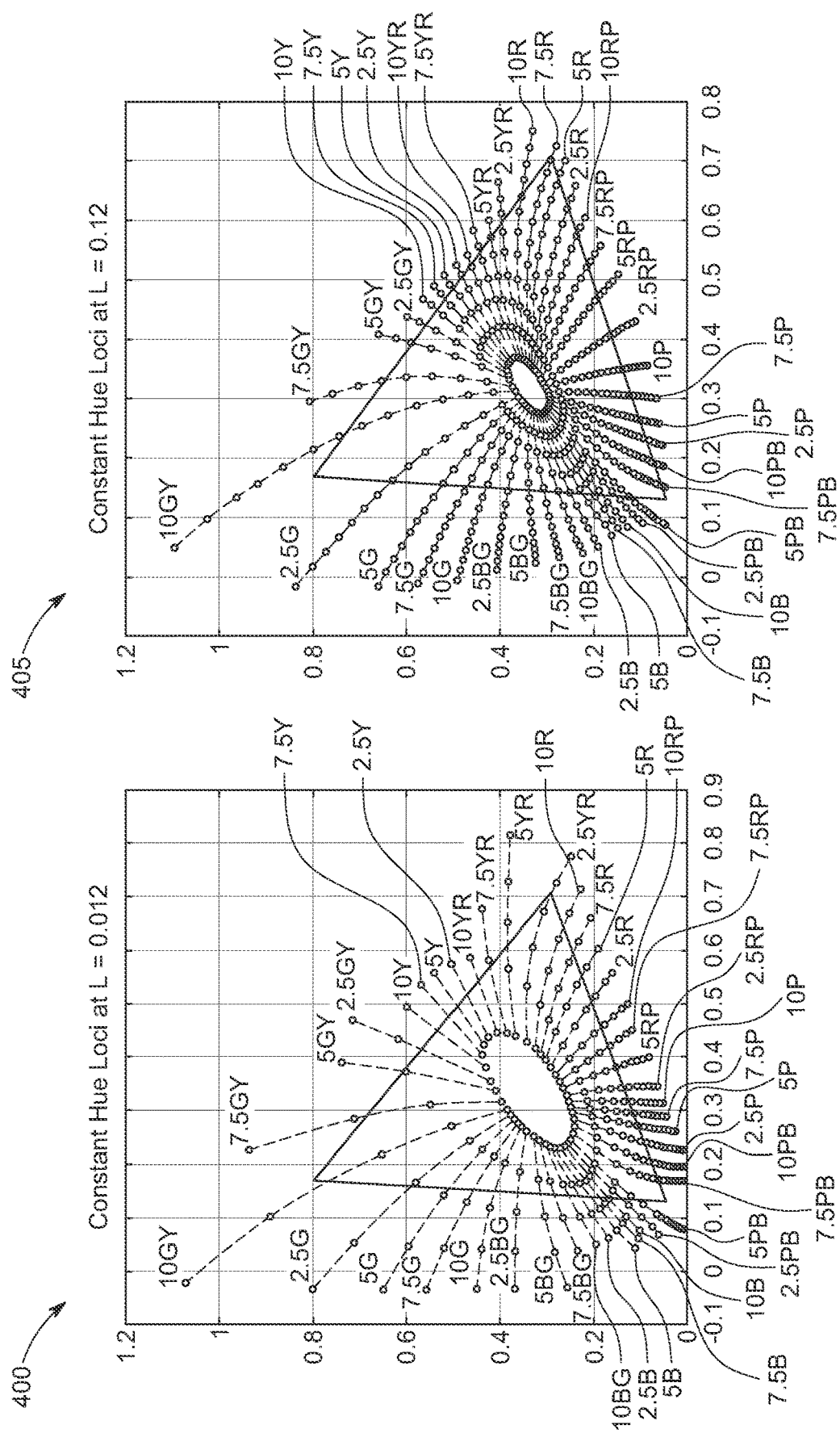
FIGS. 4A-C show examples of a perceptual uniform color sets in the CIE-1931 space based on rigorous measurements of human subjects' visual responses to color for different constant hue loci (CHL) of different levels of luminance.
Figure 4C:
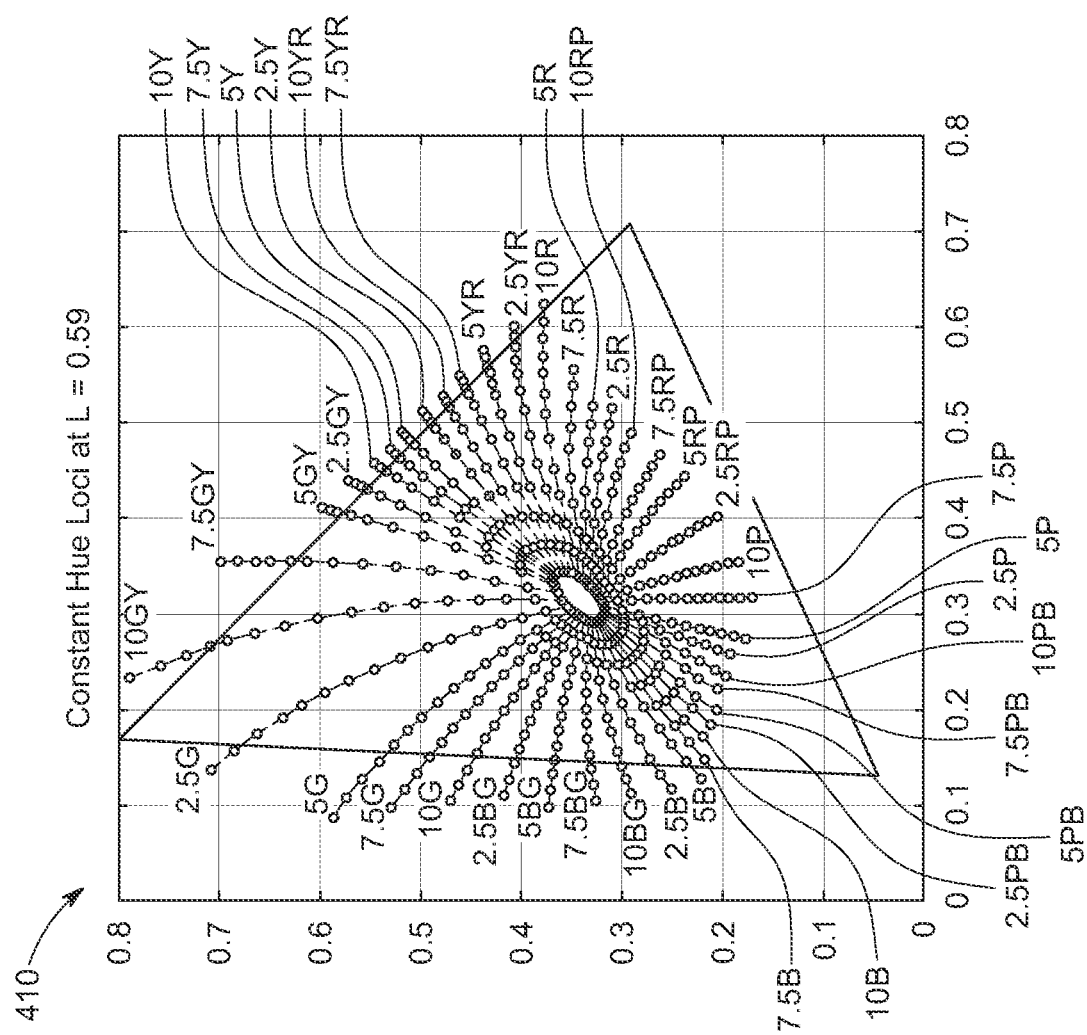

FIGS. 4A-C show examples of perceptual uniform same-hue color sets based on rigorous measurements of human subjects' visual responses to color for different CHL with different luminance values. Along a locus, all colors have the same hue but different saturation. The colors along a constant hue locus can represent how the saturation of the colors of a given hue are perceived by HVS changes. Note that HVS is non-linear, and for a different luminance, HVS may perceive different saturation changes. The CHL of different luminance levels shown in FIGS. 4A-C illustrate the non-linearity. In some embodiments, the disclosed technology can sample the same hue colors along different CHL, and can model the saturation variations of the sampled colors. Thus the disclosed technology can obtain (e.g., determine, acquire, learn, etc.) information (e.g., knowledge) about how the perceptual saturation changes when the HVS perceives different colors.

By sampling the same-hue color pairs along the CHL (see FIGS. 4A-C), the disclosed technology can model the saturation variations that the HVS perceives. However, the CHL are defined in the CIE-1931 space, which is device independent. Display/rendering devices have specific color gamut. To adopt the obtained model, the modeled saturation variations should be converted to device working spaces. For example, YCbCr is widely used in broadcasting industries, and it is in the code value domain, which is tightly related to the devices' gamut. YCbCr is an ideal color space for modeling the perceptual saturation variations of the HVS in a device-dependent space.

Figure 5A:
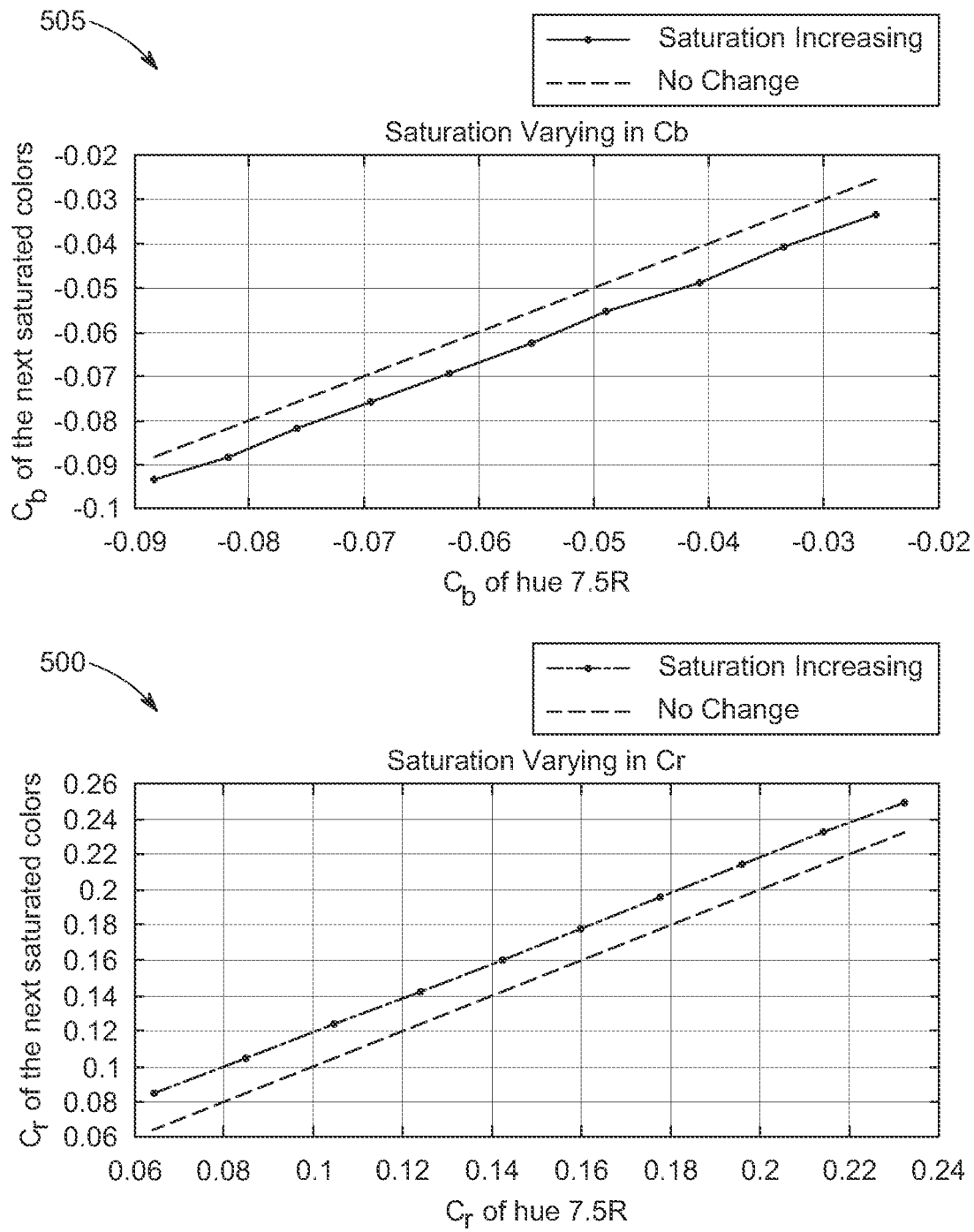
FIGS. 5A-F show examples of the same-hue saturation variations along six important CHL in a working space of some embodiments.
Figure 5B:
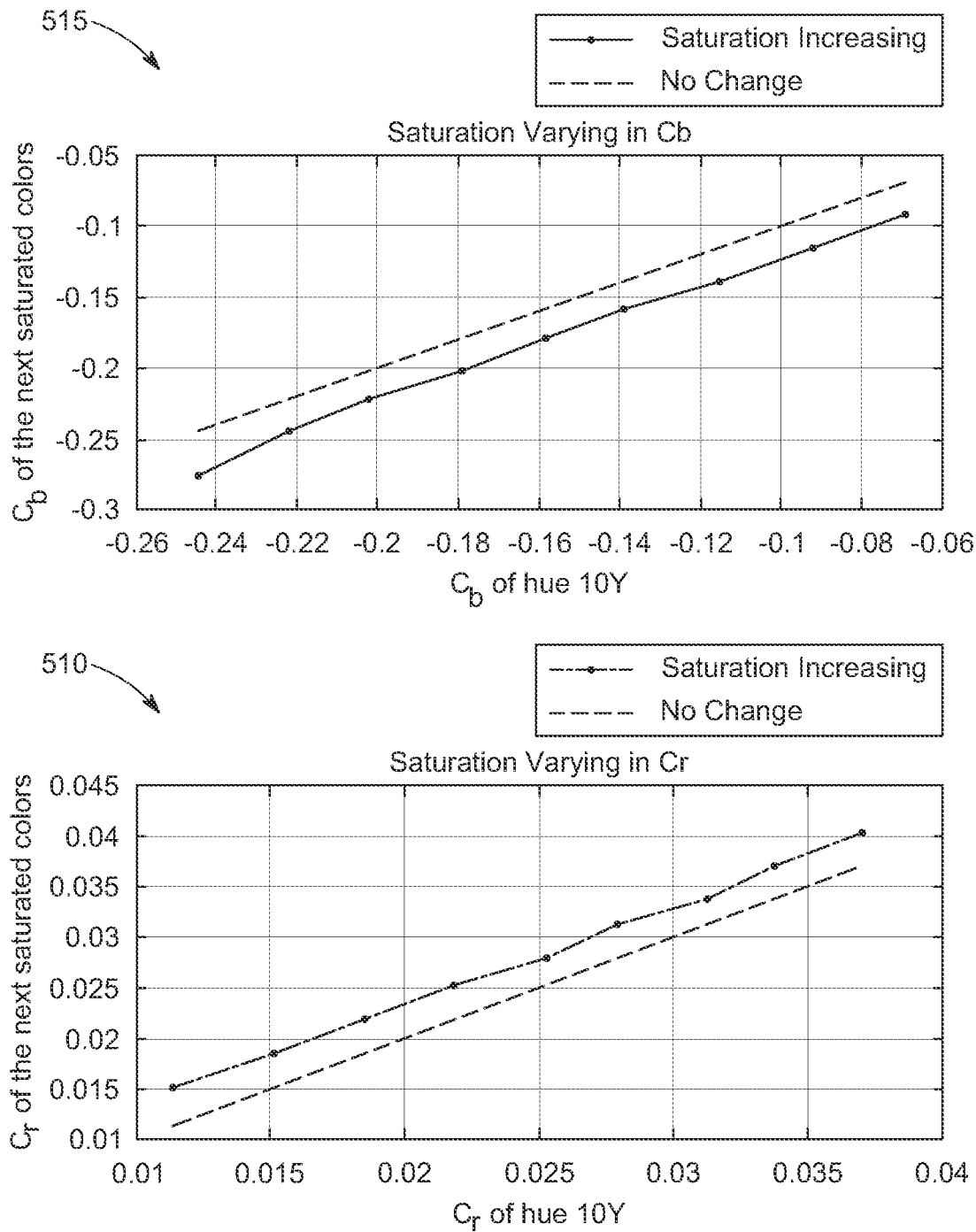
Figure 5C:
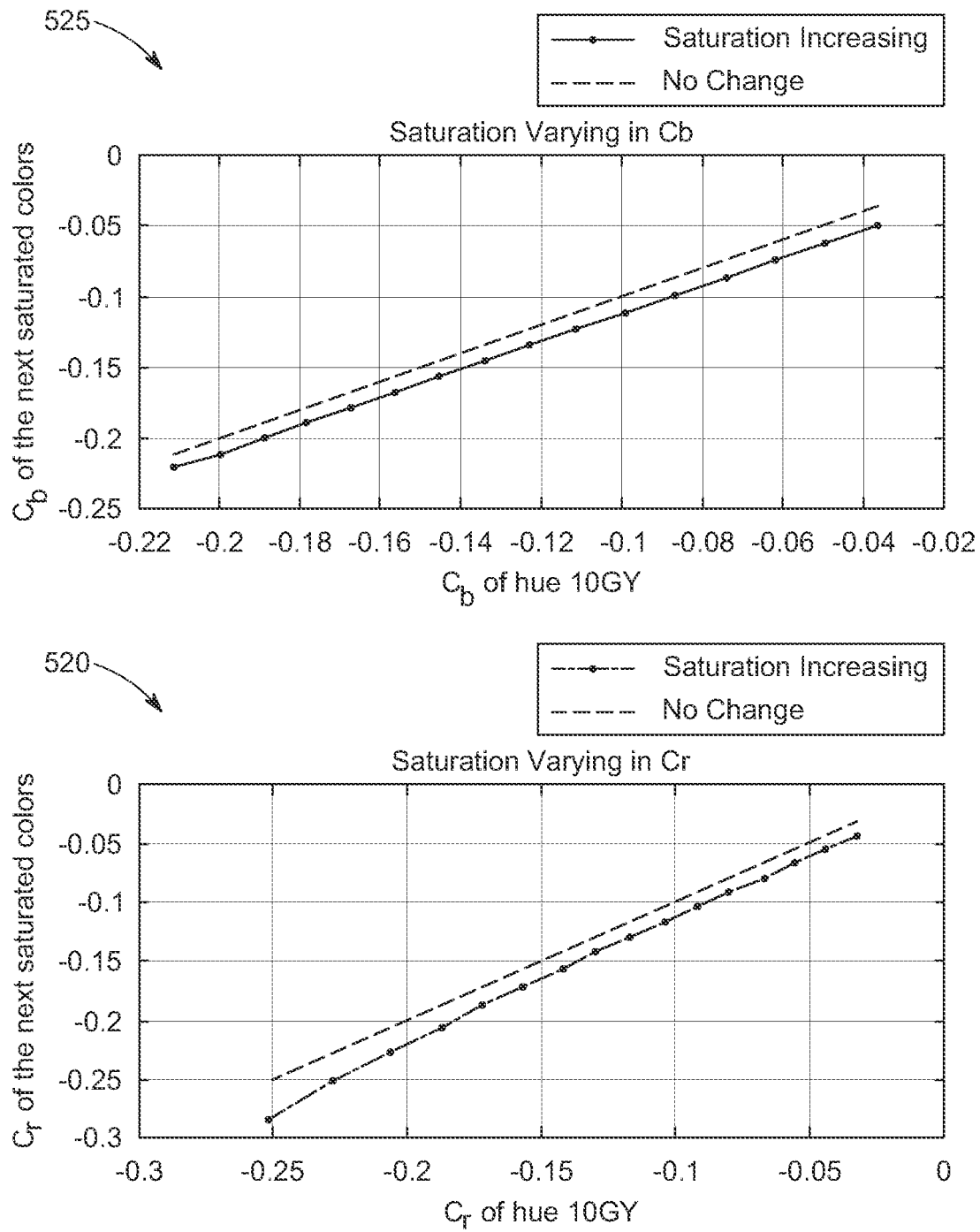
Figure 5D:
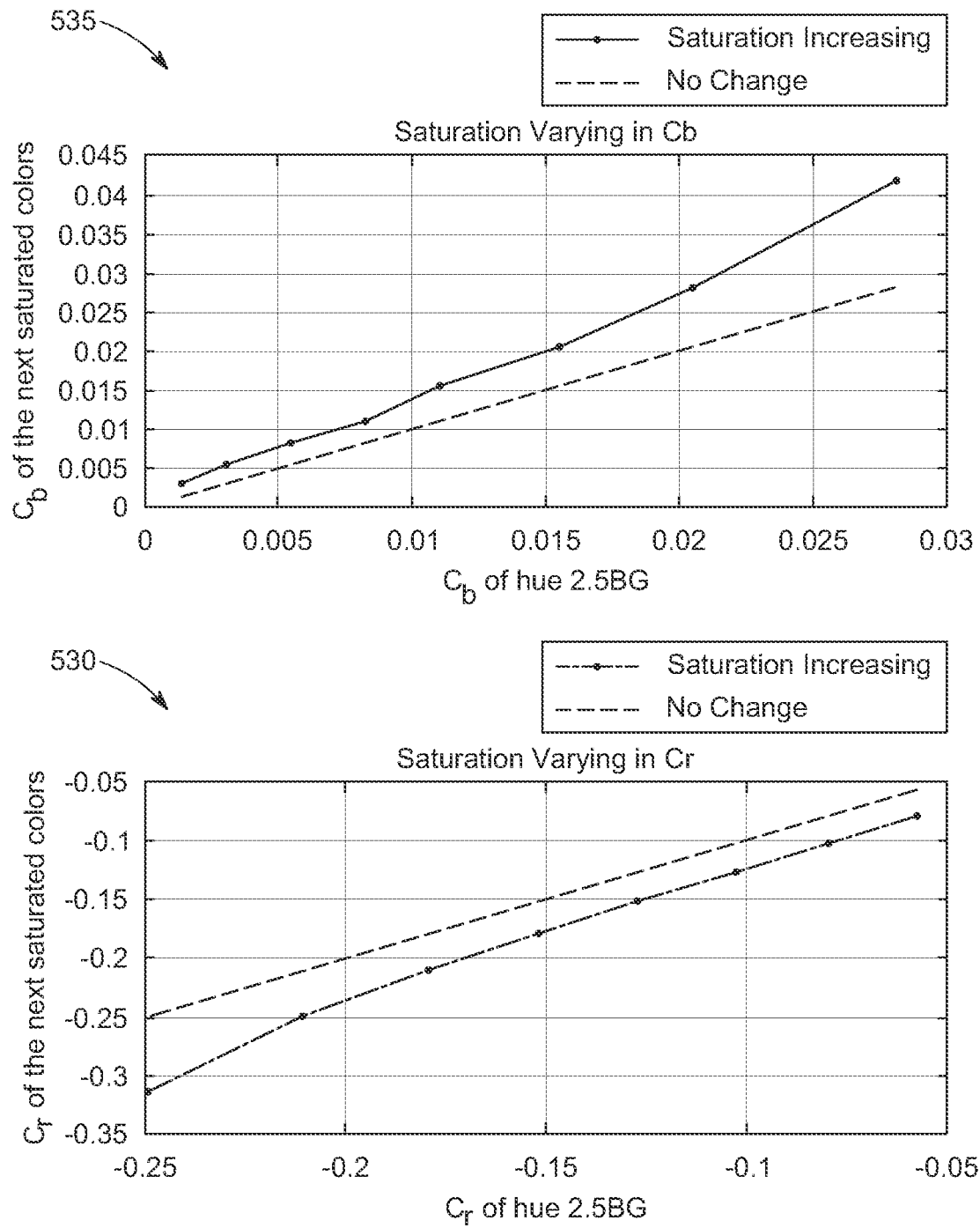
Figure 5E:
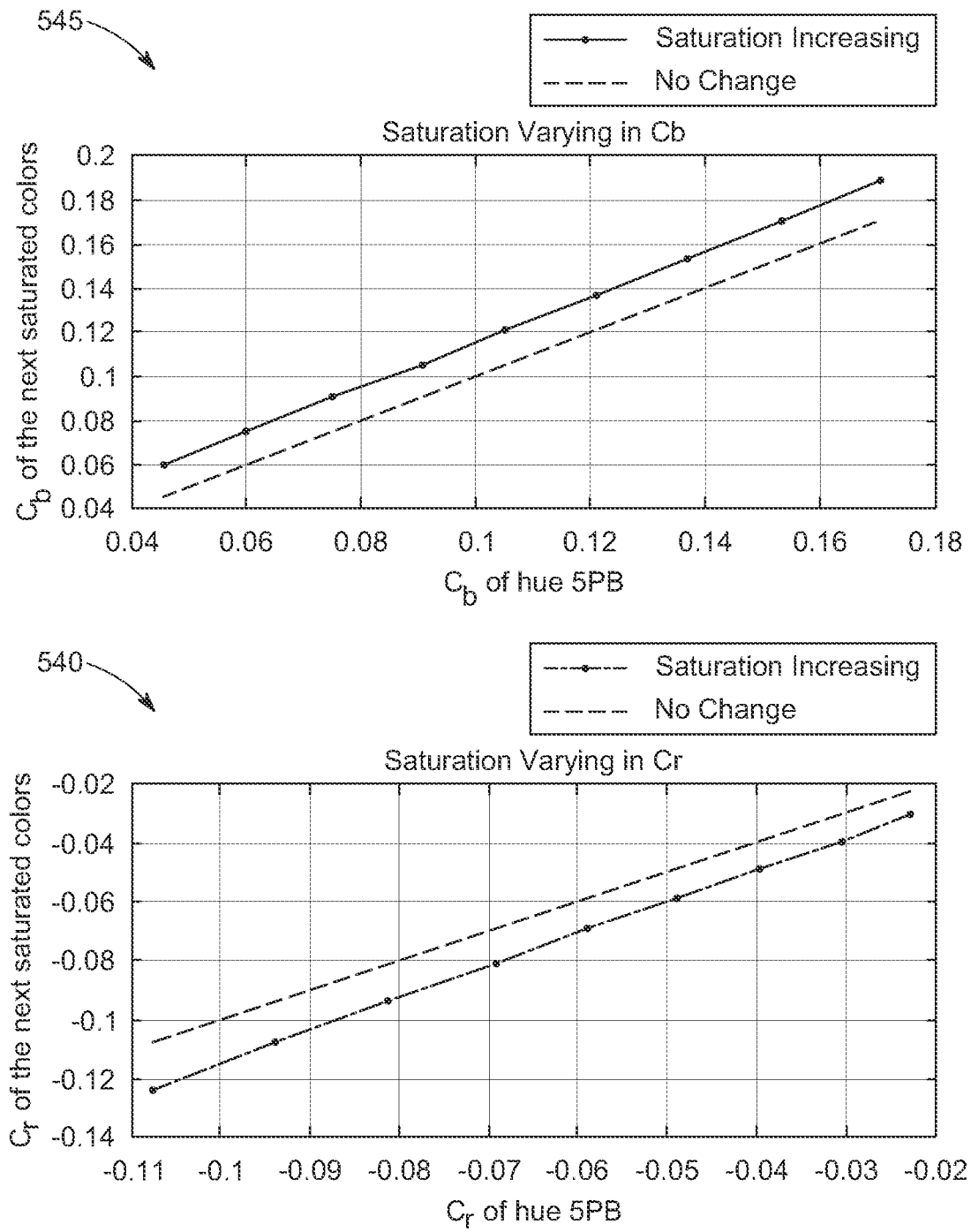
Figure 5F:
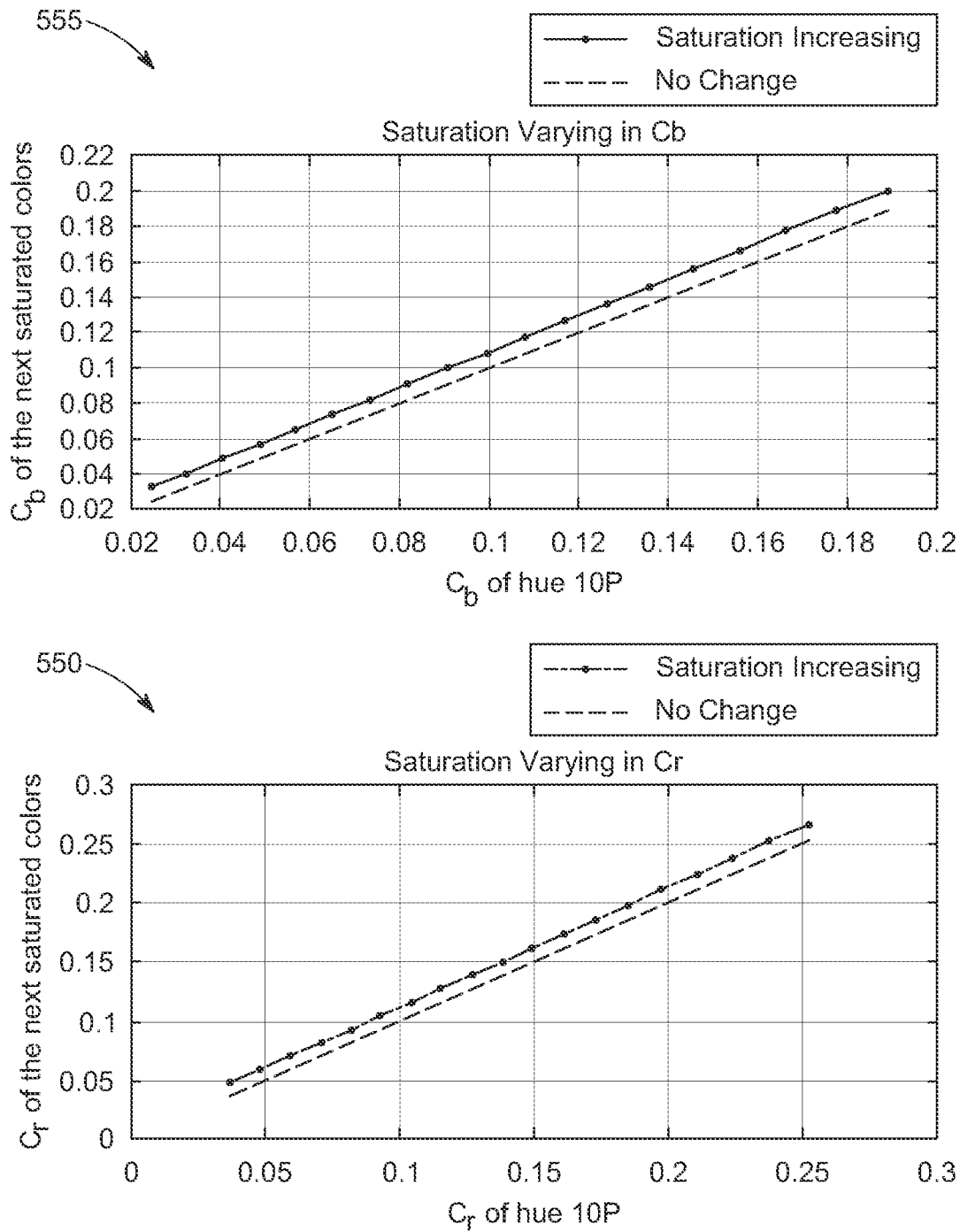

FIGS. 5A-F show graphs of example distributions of variations of $C_b$ and Cr (of the YCbCr color space) along the CHL of six important hues. In FIG. 5A, graph 500 shows Cr of hue 7.5R (red) versus Cr of the next saturated colors and graph 505 shows Cb of hue 7.5R (red) versus Cb of the next saturated colors. In FIG. 5B, graph 510 shows Cr of hue 10Y (yellow) versus Cr of the next saturated colors and graph 515 shows Cb of hue 10Y (yellow) versus Cb of the next saturated colors. In FIG. 5C, graph 520 shows Cr of hue 10GY (green) versus Cr of the next saturated colors and graph 525 shows Cb of hue 10GY (green) versus Cb of the next saturated colors. In FIG. 5D, graph 530 shows Cr of hue 2.5BG (cyan) versus Cr of the next saturated colors and graph 535 shows Cb of hue 2.5BG (cyan) versus Cb of the next saturated colors. In FIG. 5E, graph 540 shows Cr of hue 5PB (blue) versus Cr of the next saturated colors and graph 545 shows Cb of hue 5PB (blue) versus Cb of the next saturated colors. In FIG. 5F, graph 550 shows Cr of hue 10P (magenta) versus Cr of the next saturated colors and graph 555 shows Cb of hue 10P (magenta) versus Cb of the next saturated colors.

As shown in FIGS. 5A-F, in the working space (e.g., YCbCr), the Cb or Cr component does not change randomly as the saturation of the same-huecolors continuously increases. As the saturation increases, the absolute values of Cb or Cr increases, but the signs of theoriginal Cb and Cr do not change. This can be convenient for modeling the changes of Cb or Cr with functions. The amplitudes of the changes are related to the absolute values of Cb or Cr. Generally, the less-saturated and the highly-saturated colors have relatively small changes, and the colors with the medium saturation have relatively big changes. The amplitudes of the changes are identical to the properties of HVS. HVS does not have large responses to the colors close to white when their saturation is slightly increased. HVS does not generate large responses to the colors that are already very saturated when their saturation is further increased. Some embodiments mathematically model the chromatic variations of the colors of along all CHL in a working space, e.g., YCbCr.

Colors are vectors comprising multi-elements. For instance, a color in the working space (e.g., YCbCr space) can be represented as a 3-element vector [Y, Cb, Cr]. Modeling the perceptual saturation variations in 3D YCbCr domain can lead to an accurate (e.g., an optimally accurate) model. However, modeling in a high-dimensional space can be very expensive for commercial applications. First, high-dimensional modeling results in high-dimensional LUTs for saving the model in products/devices. This greatly increases the product/device costs due to the high storage requests/requirements of the LUTs. Second, a high-dimensional model requires more complex processing. This increases the computational complexity of products/devices, and eventually increases the costs. The disclosed technology can reduce the modeling dimensions without significantly changing the quality of the model. In a low-dimensional space, same-hue saturation variations can be easily modeled as a set of perceptual parameters. In an example, note that for the convenience of a perceptual model curve fitting (e.g., least square root algorithm, etc.), in a working space (e.g., YCbCr), the disclosed technology can transfer the YCbCr colors to YPbPr by subtracting 0.5 from the Cb component and the Cr component. By projecting the saturation variations of the same-hue colors in YPbPr space to the Pb and the Pr axes respectively, the disclosed technology can obtain the perceptual saturation variations along the Pb and the Pr axes, respectively. The disclosed technology can reduce the dimensions of the model by replacing the expensive multi-dimensional model with one or more one-dimensional (1D) models. As such, the disclosed technology greatly decreases the computational and/or hardware costs. For clarification and to avoid confusion, the term "Cb" is used to represent "Pb," and the term "Cr" is used to represent "Pr" in FIGS. 6A-B, since they are equivalent to each other and only have a 0.5 offset.

Figures 6A, 6B:
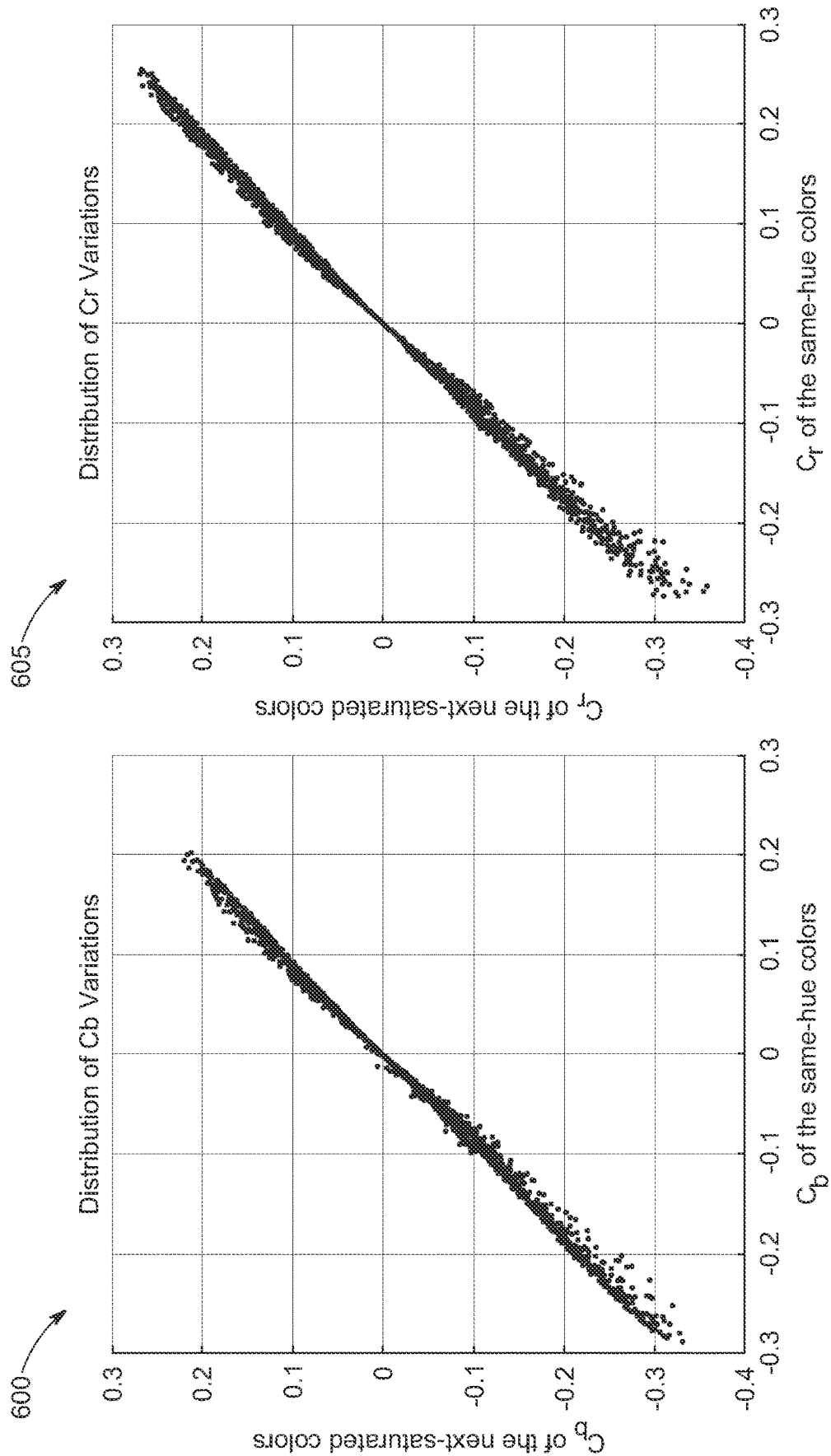
FIG. 6A shows a graph of the same-hue color variations in a high-dimensional working space YCbCr projected to the Cb axes along all the CHL with different luminance values Y, according to some embodiments.
FIG. 6B shows a graph of the same-hue color variations projected to the Cr axes along all the CHL with different luminance values Y, according to some embodiments.

FIG. 6A shows a graph 600 of the same-hue color variations (in the 3D YCbCr space to the Cb axis) in a high-dimensional working space YCbCr projected to the Cb axes along all the CHL with different luminance values Y, according to some embodiments. It should be noted that the working space is not limited to the YCbCr color space. In graph 600, the projected same-hue color variations along the Cb axes show the Cb of the same-hue colors versus the Cb of the next-saturated same-hue colors.

FIG. 6B shows a graph 605 of the same-hue color variations (in the 3D YCbCr space to the Cr axis) projected to the Cr axes along all the CHL with different luminance values Y, according to some embodiments. It should be noted that the working space is not limited to YCbCr. In graph 605, the projected same-hue color variations along the Cr axes show the Cr of the same-hue colors versus the Cr of the next-saturated same-hue colors.

Figures 7A, 7B:
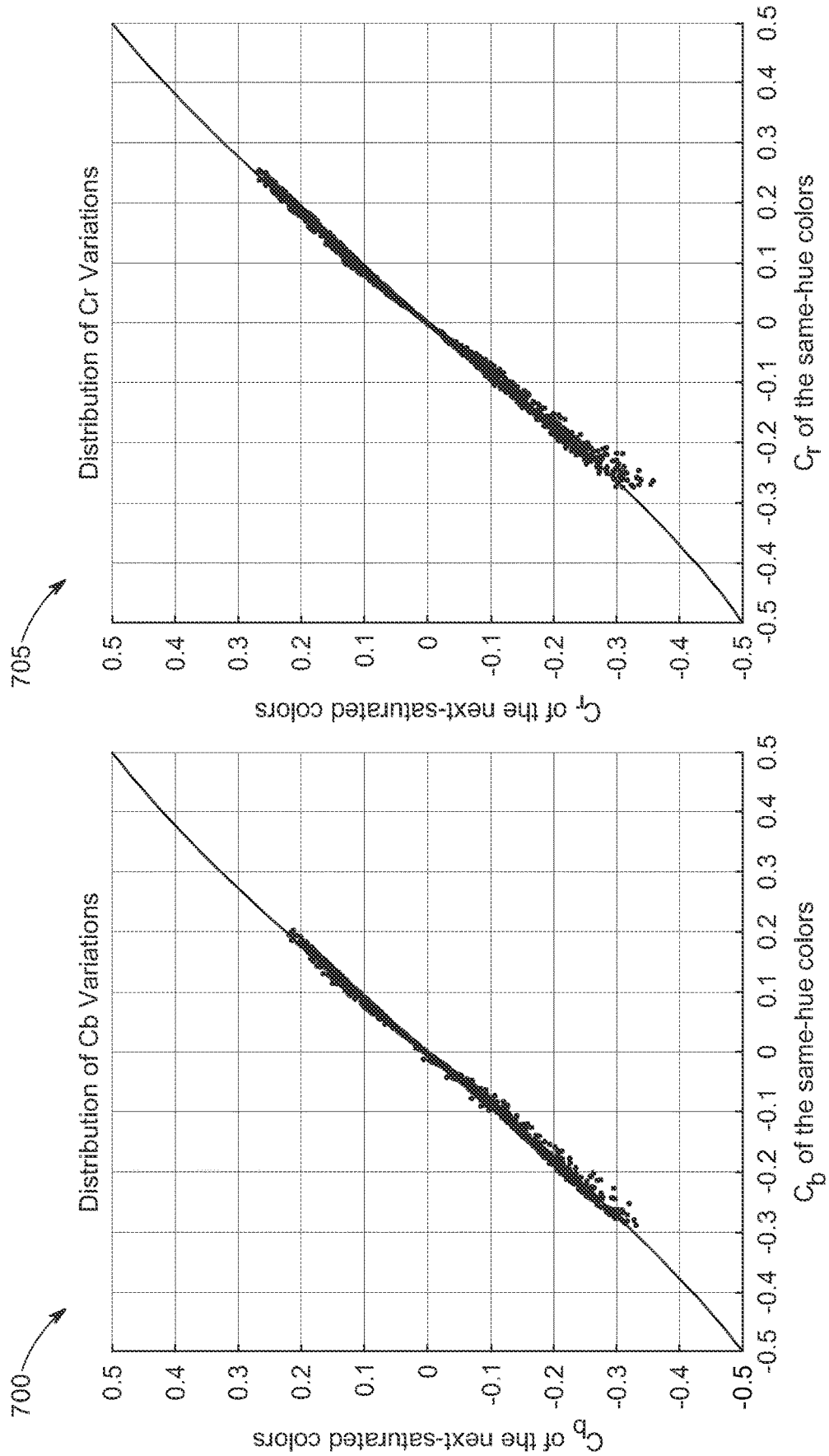
FIG. 7A shows a graph of HVS-based model for the same-hue color saturation variations of Cb along all the CHL projected to the Cb axes, according to some embodiments.
FIG. 7B shows a graph of HVS-based model for the same-hue color saturation variations of Cr along all the CHL projected to the Cr axes, according to some embodiments.

FIG. 7A shows a graph 700 of HVS-based model results for the same-hue color variations projected to the Cb-axes along all the CHL, according to some embodiments using one or more non-linear functions with perceptual parameters. In graph 700, the HVS-based model of the Cb enhancement shows the Cb of the same-hue colors are shown versus the Cb of the next-saturated colors.

FIG. 7B shows a graph 705 of HVS-based model results for the same-hue color variations projected to the Cr-axes along all the CHL, according to some embodiments using one or more non-linear functions with perceptual parameters. In graph 705, the HVS-based model of the Cr enhancement shows the Cr of the same-hue colors are shown versus the Cr of the next-saturated colors.

$$R_m, R_a, \beta, \alpha C' = R_m + \frac{R_a - R_m}{1 + \alpha e^{-\beta c}}$$

In some embodiments, the same-hue color variations projected to the Cb- and Cr-axes can be modeled with one or multiple logistic functions having a set of perceptual parameters and. The basic form of a logistic function is $$R_m, R_a, \beta, \alpha C' = R_m + \frac{R_a - R_m}{1 + \alpha e^{-\beta c}} \quad \text{Eq. 1}$$

$$R_m, R_a, \beta, \alpha C' = R_m + \frac{R_a - R_m}{1 + \alpha e^{-\beta c}}$$

where c, c' are the input and output color, $R_m$, is the minimum response of the HVS to color stimulus, $R_a$ is the maximum response of the HVS to color stimulus, $\beta$ is the sensitive imitation factor of HVS, and a is the control factor to ensure gray input colors also result in gray colors (zero pass). In one or more embodiments, depending on concrete applications, the HVS property curves may be modeled with 1, 2, 3, or 4 logistic functions.

Figure 8:
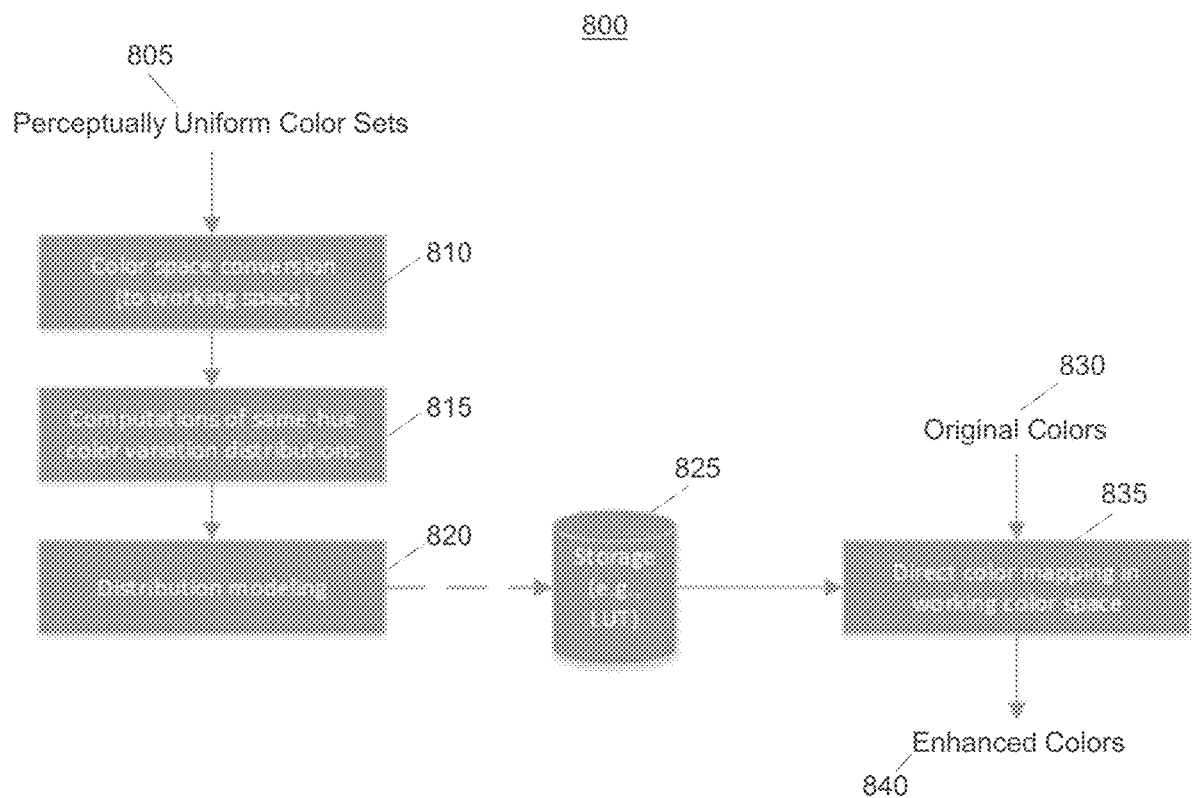
FIG. 8 shows a high-level flow for using techniques in different color space(s), including color-appearance models processing, according to some embodiments.

In some embodiments, the perceptual saturation variation modeling techniques of the disclosed technology can be extended or applied to one or more different color spaces. It is contemplated that many variations associated with the disclosed technology are possible. FIG. 8 shows a high-level flow 800 for using techniques in different color space(s), including color-appearance model processing, according to some embodiments. Some embodiments can be adaptively used in different color spaces (e.g., RGB, CMYK, Y'UV, YCbCr), including color-appearance models. The perceptually uniform color sets represented as the CHL in the CIE-1931 space are input at 805. In block 810, the flow 800 provides conversion of the color space used to the processing working space. In block 815, the flow 800 provides the computations of same-hue color variation distributions. In block 820, the flow 800 provides distribution modeling. The output of block 820 is stored in the storage 825 (e.g., LUT). In block 835, original colors 830 are input for direct color mapping in the working color space. The output from block 835 are enhanced colors 840.

Some embodiments may be applied to the following implementations (but are not limited to): all TV products including high-end ultra-high definition (UHD) and high dynamic range (HDR) TVs, mobile devices capable of rendering image/video content, software applications related to image/video content rendering, etc.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving, by a computing device, information for estimations of color saturation variations of different hues in a working color space with one or more properties of estimated responses of a human vision system (HVS) to color stimulus; and
   generating, by the computing device, one or more color saturation variation models based on the estimated responses of the HVS to color stimulus.

2. The method of claim 1, further comprising:
   mapping an input color from a source content to an output color in the working color space using the one or more color saturation variation models.

3. The method of claim 2, wherein the input color is directly mapped to the output color based on imitating HVS behavior.

4. The method of claim 1, further comprising:
   determining, by the computing device, the working color space of a source content and a resulting content.

5. The method of claim 1, wherein the color saturation variations are modeled with perceptually uniform color sets of different hues, the perceptually uniform color sets are generated based on measurements of visual responses to color stimulus.

6. The method of claim 5, wherein one of the perceptually uniform color sets of different hues includes Munsell Renotations.

7. The method of claim 5, further comprising:
   generating the perceptually uniform color sets of different hues to form same-hue color sets;
   generating perceptually uniform color sets of each hue from a same-hue color set of a hue;
   generating discrete perceptually uniform color sets in a same-hue color set of a hue; and
   modeling variations of chromatic components of the perceptually uniform color sets belonging to different hues with one or more mathematic expressions.

8. The method of claim 7, further comprising:
   adjusting a quantity of the discrete perceptually uniform color sets in the same-hue color set to control an amount of enhancement based on the one or more properties of the responses of the HVS.

9. The method of claim 8, wherein the variations of the chromatic components of the perceptually uniform color sets are independently modeled in a particular working space.

10. A non-transitory processor-readable medium that includes a program that when executed by a processor performs a perceptual color enhancement method based on properties of responses of human vision system (HVS) to color stimulus, comprising:

receiving, by the processor, information for estimations of color saturation variations of different hues in a working color space with one or more properties of estimated responses of a human vision system (HVS) to color stimulus;

generating, by the processor, one or more color saturation variation models based on the estimated responses of the HVS to color stimulus.

11. The non-transitory processor-readable medium of claim 10, wherein the method further comprising:

mapping, by the processor, an input color from a source content to an output color in the working color space using the one or more color saturation variation models.

12. The non-transitory processor-readable medium of claim 11, wherein the input color is directly mapped to the output color based on imitating HVS behavior.

13. The non-transitory processor-readable medium of claim 10, wherein the method further comprising:

determining the working color space of a source content and a resulting content.

14. The non-transitory processor-readable medium of claim 10, wherein the color saturation variations are modeled with perceptually uniform color sets of different hues, the perceptually uniform color sets are generated based on measurements of visual responses to color stimulus.

15. The non-transitory processor-readable medium of claim 14, wherein one of the perceptually uniform color sets of different hues includes Munsell Renotations.

16. The non-transitory processor-readable medium of claim 14, wherein the method further comprising:

generating the perceptually uniform color sets of different hues to form same-hue color sets;

generating perceptually uniform color sets of each hue from a same-hue color set of a hue;

generating discrete perceptually uniform color sets in a same-hue color set of a hue; and modeling variations of chromatic components of the perceptually uniform color sets belonging to different hues with one or more mathematic expressions.

17. The non-transitory processor-readable medium of claim 15, wherein:

the method further comprising:

adjusting, by the processor, a quantity of the discrete perceptually uniform color sets in the same-hue color set to control an amount of enhancement based on the one or more properties of the responses of the HVS.

18. The non-transitory processor-readable medium of claim 17, wherein the variations of the chromatic components of the perceptually uniform color sets are independently modeled in a particular working space.

19. An apparatus comprising:

a memory storing instructions; and at least one processor executes the instructions including a process configured to:

model information for estimations of color saturation variations of different hues in a working color space with one or more properties of estimated responses of a human vision system (HVS) to color stimulus; and map an input color from a source content to an output color in the working color space using the one or more color saturation variation models.

20. The apparatus of claim 19, wherein:

the process is further configured to:

determine the working color space of a source content and a resulting content; and generate the one or more color saturation variation models based on the estimated responses of the HVS to color stimulus;

the input color is directly mapped to the output color based on imitating HVS behavior;

the color saturation variations are modeled with perceptually uniform color sets of different hues;

the perceptually uniform color sets are generated based on measurements of visual responses to color stimulus; and variations of chromatic components of the perceptually uniform color sets are independently modeled in a particular working space.

* * * * *